United States Patent
Itani et al.

(10) Patent No.: US 9,327,661 B2
(45) Date of Patent: May 3, 2016

(54) ELECTRIC-WIRE PROTECTION PIPE AND HARNESS

(71) Applicants: AUTONETWORKS TECHNOLOGIES, LTD, Yokkaichi, Mie (JP); SUMITOMO WIRING SYSTEMS, LTD., Yokkaichi, Mie (JP); SUMITOMO ELECTRIC INDUSTRIES, LTD., Osaka-shi, Osaka (JP)

(72) Inventors: Yasushi Itani, Yokkaichi (JP); Fujio Sonoda, Yokkaichi (JP); Naoki Aoyama, Yokkaichi (JP); Yuichi Kimoto, Yokkaichi (JP); Masanori Kuwahara, Yokkaichi (JP); Yoshinori Sugimoto, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 74 days.

(21) Appl. No.: 14/368,370

(22) PCT Filed: Dec. 12, 2012

(86) PCT No.: PCT/JP2012/082136
§ 371 (c)(1),
(2) Date: Jun. 24, 2014

(87) PCT Pub. No.: WO2013/099597
PCT Pub. Date: Jul. 4, 2013

(65) Prior Publication Data
US 2014/0326479 A1    Nov. 6, 2014

(30) Foreign Application Priority Data

Dec. 26, 2011 (JP) ................................. 2011-283296

(51) Int. Cl.
*H02G 3/04* (2006.01)
*F16L 9/00* (2006.01)
(Continued)

(52) U.S. Cl.
CPC ............ *B60R 16/0215* (2013.01); *B21D 51/16* (2013.01); *H01B 7/0045* (2013.01);
(Continued)

(58) Field of Classification Search
CPC ............. H02G 3/04; H02G 3/00; H02G 3/02; H02G 3/22; H02G 3/24; H02G 3/26; H02G 3/28; H02G 3/30; H02G 9/06; H01B 7/24; H01B 7/184; H01B 7/0045; B60R 16/0215; B21D 51/16; F16L 9/00; F16L 9/02; F16L 9/0069
USPC ..... 174/68.1, 68.3, 72 A, 102 SP, 88 R, 70 C, 174/95; 248/68.1; 138/110, 111, 177; 72/367.1, 199
See application file for complete search history.

(56) References Cited

U.S. PATENT DOCUMENTS 4,611,636 A * 9/1986 Kanao ...................... F16L 9/16
                                                                174/68.3
5,460,894 A * 10/1995 Munch ................... F16M 11/04
                                                                174/68.3
(Continued)

FOREIGN PATENT DOCUMENTS

| JP | A-2009-011136 | 1/2009 |
| JP | A-2011-028892 | 2/2011 |
| JP | A-2011-193677 | 9/2011 |

OTHER PUBLICATIONS

Jan. 22, 2013 International Search Report issued in International Application No. PCT/JP2012/082136.

*Primary Examiner* — Angel R Estrada
(74) *Attorney, Agent, or Firm* — Oliff PLC

(57) ABSTRACT

It is an object of the exemplary embodiments to obtain a long electric-wire protection pipe having a flat outer shape, using a simple press working process, while preventing warping problems. An electric-wire protection pipe is a metal pipe that surrounds an electric wire, and has a reinforced section and a flat pipe section. The reinforced section is a section that is located at a part in the circumferential direction of the electric-wire protection pipe, and constitutes a protrusion forming, on either the internal or external surface of the electric-wire protection pipe, a ridge line extending along the longitudinal direction of the electric-wire protection pipe, and a groove extending along the longitudinal direction of the electric-wire protection pipe on the other surface. The flat pipe section is a section that constitutes at least a part in the longitudinal direction of the electric-wire protection pipe, and that is flattened by press working.

8 Claims, 5 Drawing Sheets

(51) Int. Cl.
*B60R 16/02* (2006.01)
*B21D 51/16* (2006.01)
*H01B 7/00* (2006.01)
*H01B 7/18* (2006.01)
*H01B 7/24* (2006.01)
*H02G 3/38* (2006.01)

(52) U.S. Cl.
CPC .............. *H01B 7/184* (2013.01); *H01B 7/24* (2013.01); *H02G 3/04* (2013.01); *H02G 3/0481* (2013.01); *H02G 3/0487* (2013.01); *H02G 3/28* (2013.01)

(56) References Cited

U.S. PATENT DOCUMENTS

| | | | | |
|---|---|---|---|---|
| 6,311,730 | B2* | 11/2001 | Penza | F16L 11/00 138/114 |
| 7,004,681 | B2* | 2/2006 | Penza | H02G 9/06 405/184.2 |
| 8,978,711 | B2* | 3/2015 | Satou | F16L 9/19 138/114 |
| 8,993,888 | B2* | 3/2015 | Chamberlain | H02G 9/06 174/95 |
| 2009/0000682 | A1 | 1/2009 | Kisu et al. | |
| 2013/0008711 | A1 | 1/2013 | Toyama et al. | |

* cited by examiner

ELECTRIC-WIRE PROTECTION PIPE AND HARNESS

TECHNICAL FIELD

The inventive principles described herein relate to an electric-wire protection pipe that is preferably made from metal and surrounds an electric wire, and to a wire harness including the same.

BACKGROUND ART

Conventionally, a wire harness that is laid at a position exposed to the outside of a vehicle, e.g. an automobile, such as a lower surface of the bottom plate (underflooring) of the vehicle, sometimes includes an electric-wire protection pipe that is made from metal and surrounds the electric wires. The electric-wire protection pipe protects the electric wires from foreign substances such as gravel flying up from the road, and functions as an electromagnetic shielding pipe for shielding from noise electromagnetic waves. Therefore, the electric wires inserted into the hollow part of the electric-wire protection pipe are usually unshielded electric wires. "Unshielded electric wire" refers to an insulated electric wire that is not covered with a shielding member, such as a braided wire.

Furthermore, the electric-wire protection pipe that is laid out at the bottom plate of the vehicle has to meet the following requirements. First, the electric-wire protection pipe is required to have a hollow part whose internal cross-sectional area is sufficiently large for the plurality of electric wires to be inserted into the hollow part. Furthermore, the electric-wire protection pipe is required to have an outer shape with a projection height from the lower surface of the bottom plate that is as low as possible.

In order to meet the above-described requirements, it is conceivable to use, as an electric-wire protection pipe, a metal pipe having a flat outer shape. For example, the electric-wire protection pipe disclosed in Patent Document 1 is a metal pipe having a flat outer shape that is obtained by performing press working on a round pipe having a circular cross-sectional shape.

CITATION LIST

Patent Documents

Patent Document 1: JP 2011-193677A

SUMMARY

Technical Problem

Meanwhile, an electric-wire protection pipe that is laid out at the bottom plate of a vehicle is a long pipe that extends from the vicinity of the front wheels of the vehicle to the vicinity of its rear wheels. Its length reaches 3 meters or more. Furthermore, the press working on the long round pipe is performed using a press working apparatus. The press working apparatus includes a pressure roller that rotates and an opposite member arranged opposite to the pressure roller. In this case, the round pipe is sandwiched between the pressure roller and the opposite member, is flattened with the pressure of the pressure roller, and is fed out of the processing position between the pressure roller and the opposite member.

Note that there may be a case where the opposite member is a pressure roller, that is, the press working apparatus includes a pair of pressure rollers facing each other.

However, if a long round pipe is flattened by the press working apparatus, the problem is likely to occur that the pipe warps in the direction opposite to the pressure direction. Therefore, it is difficult for the conventional technique to shape a long electric-wire protection pipe having a flat outer shape using a simple press working process.

It is an object of the exemplary embodiments to enable a long electric-wire protection pipe having a flat outer shape to be obtained, using a simple press working process, while reducing or even preventing the warping problems.

Solution to Problem

An electric-wire protection pipe according to a first aspect of the exemplary embodiments are directed to a pipe that is made from metal and surrounds an electric wire, and includes the following constituent components. (1) A first constituent component is a reinforced section that is located at a part in the circumferential direction of the electric-wire protection pipe, the reinforced section constituting a protrusion that forms a ridge line extending along the longitudinal direction of the electric-wire protection pipe on either the internal or external surface of the electric-wire protection pipe, and a groove that extends along the longitudinal direction of the electric-wire protection pipe on the other surface. (2) A second constituent component is a flat pipe section that constitutes at least a part in the longitudinal direction of the electric-wire protection pipe, and that is flattened by press working.

An electric-wire protection pipe according to a second aspect of the exemplary embodiments are directed to an aspect of the electric-wire protection pipe according to the first aspect. In the electric-wire protection pipe according to the second aspect, the flat pipe section is such that its outer size in a first direction is smaller than its outer size in a second direction that is orthogonal to the first direction, the first direction being a direction from a first circumferential region, in which the reinforced section is formed, in the circumferential direction of the electric-wire protection pipe toward a second circumferential region, which is opposite to the first circumferential region.

An electric-wire protection pipe according to a third aspect of the exemplary embodiments are directed to an aspect of the electric-wire protection pipe according to the first or second aspect. In the electric-wire protection pipe according to the third aspect, the flat pipe section includes a narrowed flat pipe section. The narrowed flat pipe section forms a narrowed section in a region in the circumferential direction of the electric-wire protection pipe in which the reinforced section is not formed, the narrowed section being recessed from adjacent sections in the longitudinal direction of the electric-wire protection pipe.

Furthermore, the exemplary embodiments are directed to a wire harness that includes an electric wire, and the above-described electric-wire protection pipe according to the above aspects.

Advantageous Effects

The electric-wire protection pipe according to the exemplary embodiments are obtained by performing press working on a round pipe having a reinforced section that extends along the longitudinal direction of the round pipe. In the electric-wire protection pipe according to the exemplary embodiments, the reinforced section that extends along the longitudinal direction of the electric-wire protection pipe prevents the pipe from warping due to the press working. Therefore, according to the exemplary embodiments, it is possible to obtain a long electric-wire protection pipe including a flat pipe section, using a simple press working process, while preventing the warping problems.

Furthermore, in the electric-wire protection pipe according to the second aspect, the flat pipe section is obtained by pressing the first circumferential region, in which the reinforced section is formed, and the second circumferential region, which is opposite to the first circumferential region, against the first direction. Therefore, when setting a pipe member to be subjected to press working in the press working apparatus, the position of the reinforced section serves as a target for the press working direction, thus suppressing the press working direction from varying with respect to the pipe member.

Furthermore, the electric-wire protection pipe according to the third aspect is also applicable to the case where there is a relatively thin obstacle on a part of a path on which the electric-wire protection pipe is to be laid. In this case, the electric-wire protection pipe is arranged such that the narrowed section formed by the narrowed flat pipe section overlaps with the obstacle. According to the third aspect, the path on which the electric-wire protection pipe is to be laid has a high degree of freedom.

Furthermore, the electric-wire protection pipe according to the third aspect is also applicable to the case where it is desirable to prevent a fixture for fixing the electric-wire protection pipe to a support such as the bottom plate of a vehicle from projecting from the electric-wire protection pipe. In this case, the electric-wire protection pipe is fixed to the support with the fixture that is fit into the narrowed section formed by the narrowed flat pipe section. According to the third aspect, it is possible to solve the disadvantage of the fixture projecting from the electric-wire protection pipe.

DESCRIPTION OF EMBODIMENTS

Hereinafter, embodiments of the exemplary embodiments will be described with reference to the accompanying drawings. The following embodiments are specific examples of the exemplary embodiments, and do not limit the technical scope of the claimed subject matter.

First Embodiment

First, configurations of an electric-wire protection pipe 1 and a wire harness 2 including the electric-wire protection pipe 1 according to a first embodiment of the exemplary embodiments will be described with reference to FIGS. 1 and 2. The electric-wire protection pipe 1 is a metal pipe member that surrounds electric wires 9. The electric-wire protection pipe 1 is made from a material that is preferably constituted by metal such as iron, stainless steel, aluminum, or an alloy including these metals, for example. Furthermore, a plated layer or a paint layer may be formed on the surface of the electric-wire protection pipe 1 as needed.

The wire harness 2 includes the plurality of electric wires 9, and the electric-wire protection pipe 1 surrounding these electric wires 9. That is to say, in the wire harness 2, the electric wires 9 pass through the hollow part of the electric-wire protection pipe 1. Note that, in FIGS. 1 and 2, the electric wires 9 are indicated by phantom lines (alternate long and two short dashed lines).

Figure 1:
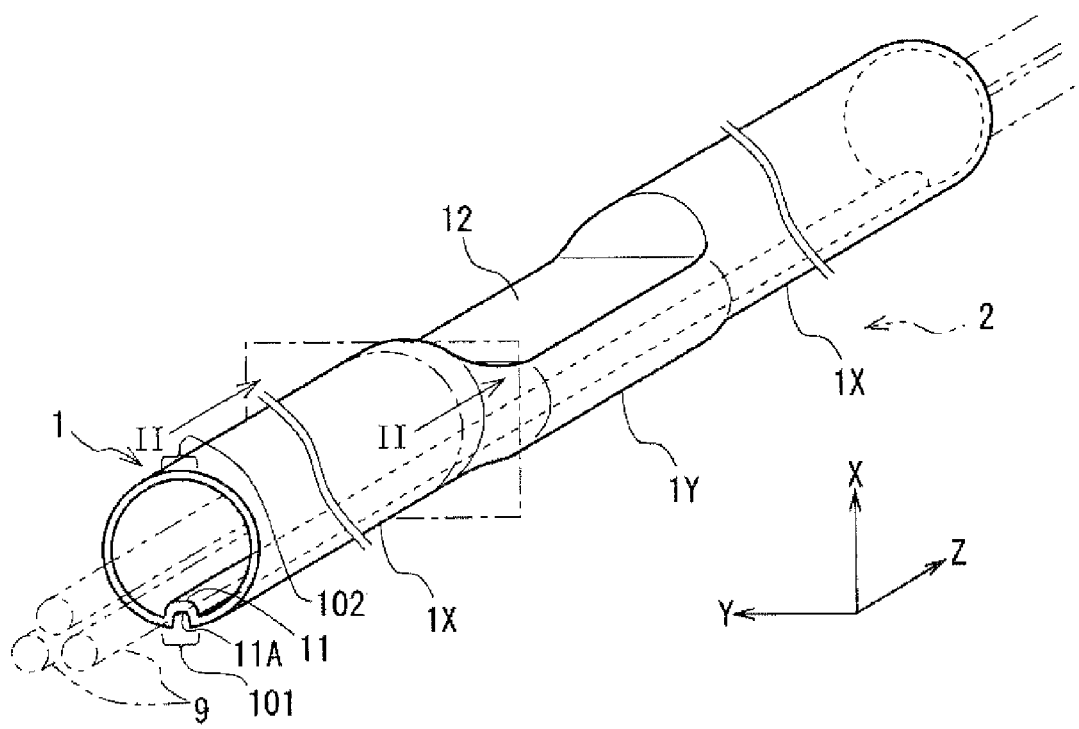
FIG. 1 is a perspective view illustrating an electric-wire protection pipe 1 according to a first embodiment.
Figure 2:
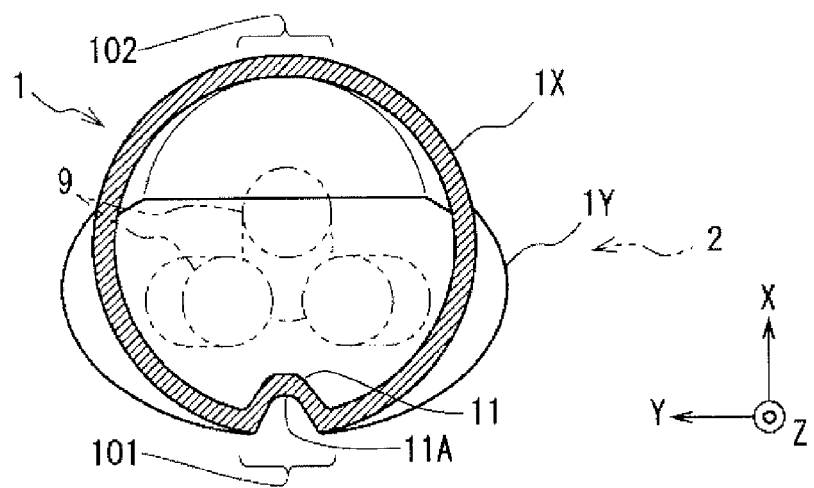
FIG. 2 is a cross-sectional view illustrating the electric-wire protection pipe 1.

As illustrated in FIGS. 1 and 2, a reinforced section 11 is formed at a part in the circumferential direction of the electric-wire protection pipe 1. Furthermore, a narrowed flat pipe section 1Y is formed at a part in the longitudinal direction of the electric-wire protection pipe 1. Moreover, round pipe sections 1X are formed in the remaining sections in the longitudinal direction of the electric-wire protection pipe 1. Note that the longitudinal direction of the pipe may also be referred to as the axial direction of the pipe.

The reinforced section 11 is a section that is located at a part in the circumferential direction of the electric-wire protection pipe 1, and constitutes, on its internal surface, a protrusion forming a ridge line extending along the longitudinal direction of the electric-wire protection pipe 1. The reinforced section 11 has the same thickness as the other parts. Accordingly, a groove 11A that extends along the longitudinal direction of the electric-wire protection pipe 1 is formed on the external surface of the pipe, at the reinforced section 11. That is, the reinforced section 11 is formed in a folded manner on the internal surface of the electric-wire protection pipe 1, thereby constituting, on the internal surface, a protrusion forming a ridge line extending along the longitudinal direction of the electric-wire protection pipe 1.

In the present embodiment, the reinforced section 11 is formed continuously along the entire length in the longitudinal direction of the electric-wire protection pipe 1, at a part in the circumferential direction of the electric-wire protection pipe 1.

The reinforced section 11 of the electric-wire protection pipe 1 is a protrusion that protrudes from the internal surface of the electric-wire protection pipe 1. Therefore, if the reinforced section 11 is formed at a sharp angle, the electric wires 9 may be damaged by getting into contact with the reinforced section 11. In order to prevent the electric wires 9 from being damaged, it is preferable that the surface of the reinforced section 11 that protrudes from the internal surface of the electric-wire protection pipe 1 be rounded off.

In the following description, the region in the circumferential direction of the electric-wire protection pipe 1 in which the reinforced section 11 is formed is referred to as "first circumferential region 101". Furthermore, the region in the circumferential direction of the electric-wire protection pipe 1 that is opposite to the first circumferential region 101 is referred to as "second circumferential region 102".

Furthermore, the direction from the first circumferential region 101 of the electric-wire protection pipe 1 toward the second circumferential region 102 thereof is referred to as "first direction". Moreover, the direction that is orthogonal to the first direction is referred to as "second direction". In the coordinate axes shown in the figures, the X-axis denotes the first direction, and the Y-axis denotes the second direction. Furthermore, the Z axis, which is orthogonal to the X-axis and the Y-axis, denotes the longitudinal direction of the electric-wire protection pipe 1.

The narrowed flat pipe section 1Y constitutes a part in the longitudinal direction of the electric-wire protection pipe 1. The narrowed flat pipe section 1Y is a section that is flattened by performing press working on a round pipe member having the reinforced section 11. Note that "flat pipe" means that the pipe has a flat cross-sectional shape. That is to say, the pipe has different widths (sizes) in the direction of the minimum width of the cross-sectional shape of the pipe and the direction that is orthogonal to that direction.

Furthermore, the narrowed flat pipe section 1Y forms a narrowed section 12 in a region in the circumferential direction of the narrowed flat pipe section 1Y in which the reinforced section 11 is not formed, the narrowed section 12 being recessed from the adjacent sections in the longitudinal direction of the pipe. Therefore, there is a difference in height between the narrowed flat pipe section 1Y and the adjacent sections in the longitudinal direction of the electric-wire protection pipe 1. The adjacent sections of the electric-wire protection pipe 1 that are adjacent to the narrowed flat pipe section 1Y are the round pipe sections 1X.

In the present embodiment, the narrowed flat pipe section 1Y is formed into a flat shape in which its outer size in the first direction (X-axis direction) is smaller than its outer size in the second direction (Y-axis direction). Furthermore, the narrowed flat pipe section 1Y in the present embodiment forms the narrowed section 12 in the second circumferential region 102 of the region in the circumferential direction in which the reinforced section 11 is not formed, the narrowed section 12 being recessed from the adjacent sections in the longitudinal direction of the pipe.

On the other hand, the round pipe sections 1X are the remaining sections on which no press working has been performed, of the round pipe member having the reinforced section 11. Therefore, disregarding the reinforced section 11, the round pipe sections 1X have an arc-like cross-sectional shape.

The electric-wire protection pipe 1 having the above-described structure includes the reinforced section 11, and thus has high rigidity in the longitudinal direction. On the other hand, the electric-wire protection pipe 1 can be flattened in the sections other than the reinforced section 11, by press working in a relatively simple manner.

Figure 3:
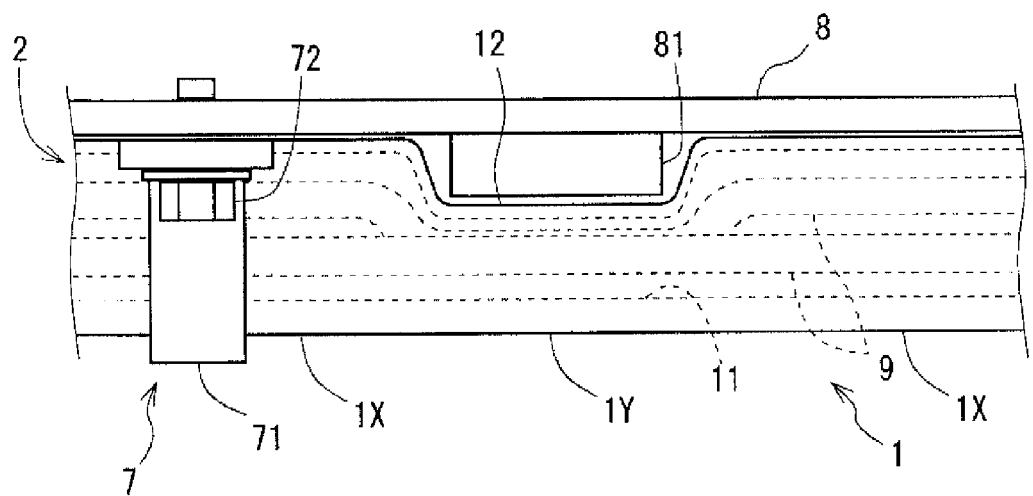
FIG. 3 is a side view illustrating a first state in which a wire harness 2 including the electric-wire protection pipe 1 is fixed to a support.
Figure 4:
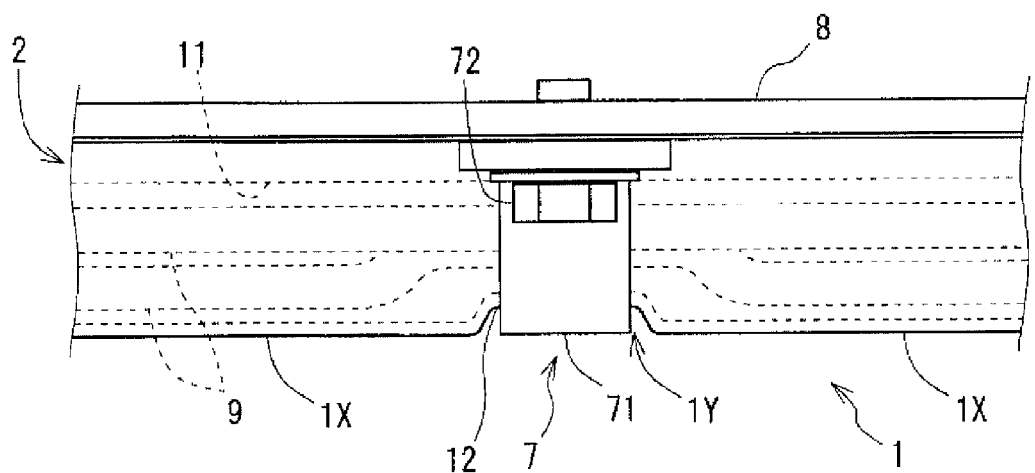
FIG. 4 is a side view illustrating a second state in which the wire harness 2 including the electric-wire protection pipe 1 is fixed to the support.

Hereinafter, an example of the state in which the wire harness 2 including the electric-wire protection pipe 1 is fixed to a support 8 such as the bottom plate of a vehicle will be described with reference to FIGS. 3 and 4. FIG. 3 is a side view illustrating a first state in which the wire harness 2 is fixed to the support 8. FIG. 4 is a side view illustrating a second state in which the wire harness 2 is fixed to the support.

As shown in FIGS. 3 and 4, the electric-wire protection pipe 1 is fixed to the support 8 using a fixture 7. The fixture 7 is constituted by a fixing metal fitting 71 that forms a groove into which the electric-wire protection pipe 1 is fit, and bolts 72 for fastening the fixing metal fitting 71 on the support 8.

The example shown in FIG. 3 is an example in which the electric-wire protection pipe 1 is arranged such that the narrowed section 12 formed by the narrowed flat pipe section 1Y overlaps with an obstacle 81 that is located in a manner projecting from the support 8. As shown in FIG. 3, the electric-wire protection pipe 1 is also applicable to the case where there is a relatively thin obstacle 81 on a part of a path on which the electric-wire protection pipe 1 is to be laid.

The example shown in FIG. 4 is an example in which the electric-wire protection pipe 1 is fixed to the support 8 by the fixing metal fitting 71 that is fit into the narrowed section 12 formed by the narrowed flat pipe section 1Y, and the bolts 72. In the example shown in FIG. 4, the electric-wire protection pipe 1 is fixed to the support 8 in a state in which the fixture 7 does not project from the electric-wire protection pipe 1.

Figure 5:
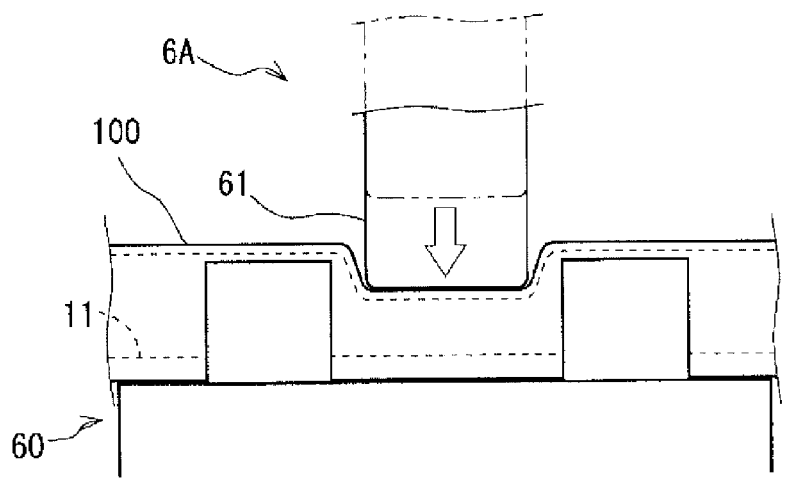
FIG. 5 is a diagram illustrating a process for forming a narrowed flat pipe section at a part of the electric-wire protection pipe 1.
Figure 6:
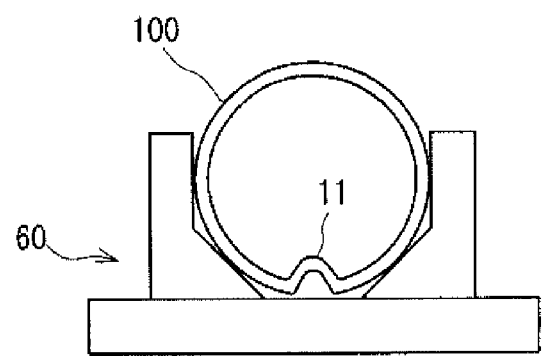
FIG. 6 is a diagram illustrating a metal mold for use in the process for forming a narrowed flat pipe section at a part of the electric-wire protection pipe 1, and a round pipe set in the metal mold.

Hereinafter, a method for manufacturing the electric-wire protection pipe 1 will be described with reference to FIGS. 5 and 6. FIG. 5 is a diagram illustrating a process for forming the narrowed flat pipe section 1Y at a part of the electric-wire protection pipe 1. FIG. 6 is a diagram illustrating a lower metal mold 60 for use in the process for forming the narrowed flat pipe section 1Y at a part of the electric-wire protection pipe 1, and a round pipe member 100 having the reinforced section 11 that is set in the lower metal mold 60.

The electric-wire protection pipe 1 is manufactured by manufacturing the round pipe member 100 having the reinforced section 11 and subjecting the round pipe member 100 to press working. The round pipe member 100 having the reinforced section 11 is manufactured by processing, for example, a round pipe member 100X having a circular cross-sectional shape using a press working apparatus 6C as shown in FIG. 10.

Figure 10:
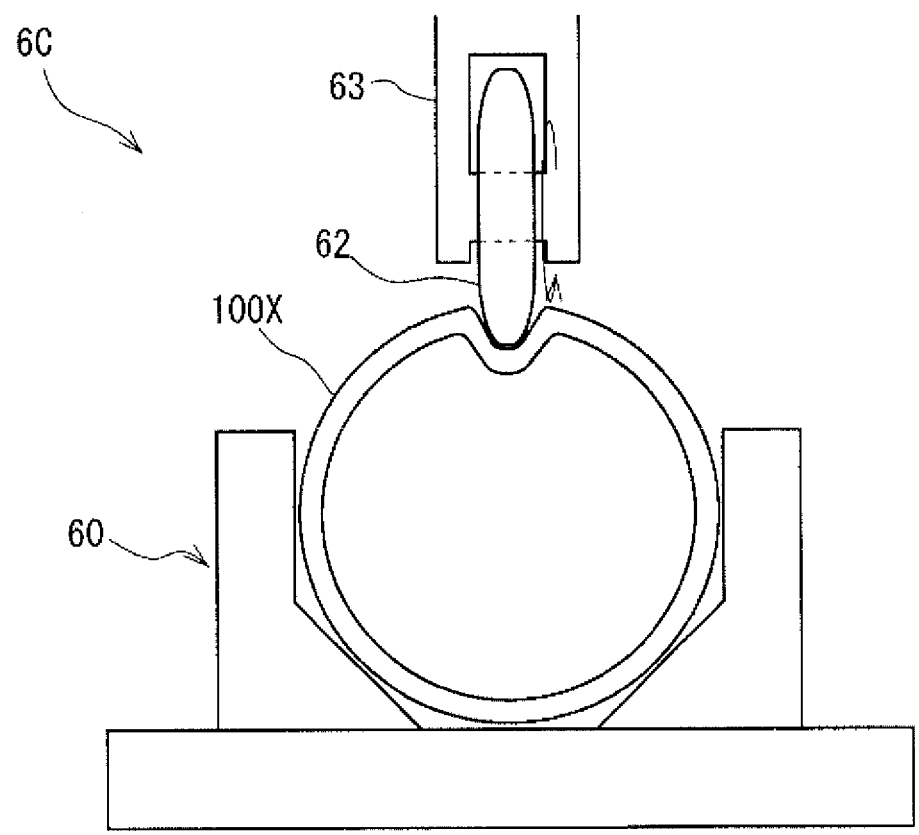
FIG. 10 is a diagram illustrating a process for forming a reinforced section in a round pipe member.

The press working apparatus 6C shown in FIG. 10 includes a lower metal mold 60 for supporting the round pipe member 100X, which has a circular cross-sectional shape, a narrow pressure roller 62 arranged facing the lower metal mold 60, and a roller driving device 63 for rotating the pressure roller 62.

The lower metal mold 60 is brought into contact with the outer circumferential surface of the round pipe member 100X in at least three directions, thereby preventing the sections other than the section with which the pressure roller 62 is brought into contact from deforming. These three directions include the direction that is opposite to the press direction in which the pressure roller 62 applies pressure, and the directions that are orthogonal to that direction. The lower metal mold 60 shown in FIG. 10 is in contact with the outer circumferential surface of the round pipe member 100 in five directions. These five directions include the direction that is opposite to the direction in which the pressure roller 62 applies pressure, two directions that are orthogonal to that direction, and two other directions.

Moreover, the round pipe member 100X having the circular cross-sectional shape is inserted between the lower metal mold 60 and the opposing pressure roller 62 from one end of the round pipe member 100X. Thus, the round pipe member 100X is sandwiched between the lower metal mold 60 and the pressure roller 62, a recess is formed at a part in the circumferential direction of the round pipe member 100X due to the pressure of the pressure roller 62, and the round pipe member 100X is fed out of the processing position between the lower metal mold 60 and the pressure roller 62. Accordingly, the round pipe member 100 having the reinforced section 11 as shown in FIG. 6 is shaped.

Note that the round pipe member 100 having the reinforced section 11 is manufactured by subjecting a metal material softened by heat to extrusion molding or pultrusion molding that uses a metal mold referred to as a die.

Furthermore, the narrowed flat pipe section 1Y is shaped by performing press working on the round pipe member 100 having the reinforced section 11. For example, as shown in FIG. 6, the narrowed flat pipe section 1Y is shaped by a press working apparatus 6A that includes the lower metal mold 60 for supporting the round pipe member 100, and an upper metal mold 61 for shaping the narrowed section 12 of the narrowed flat pipe section 1Y.

As shown in FIGS. 5 and 6, the lower metal mold 60 supports a part to be processed of the round pipe member 100 while facing the upper metal mold 61, and is adjacent to the outer circumferential surfaces of the adjacent sections that are adjacent to the part to be processed in the longitudinal direction of the round pipe member 100, thereby preventing the adjacent sections from deforming.

More specifically, as shown in FIG. 6, the lower metal mold 60 is in contact with the outer circumferential surfaces of the adjacent sections that are adjacent to the part to be processed in the longitudinal direction of the round pipe member 100, in at least three directions, namely, the direction that is opposite to the press direction in which the upper metal mold 61 applies pressure, and the directions that are orthogonal to that direction. With this, the lower metal mold 60 prevents deformation of the adjacent sections adjacent to the part to be processed. In FIG. 6, the lower metal mold 60 is in contact with the outer circumferential surfaces of the adjacent sections that are adjacent to the part to be processed in the longitudinal direction of the round pipe member 100, in five directions, namely, the direction that is opposite to the press direction in which the upper metal mold 61 applies pressure, two directions that are orthogonal to that direction, and two other directions.

Also, by pressing the upper metal mold 61 against a part of the round pipe member 100 supported by the lower metal mold 60, the narrowed flat pipe section 1Y is formed in the part of the round pipe member 100. Furthermore, the remaining sections of the round pipe member 100 against which the upper metal mold 61 is not pressed, that is, the remaining sections that are not subjected to press working serve as the round pipe sections 1X.

As described above, the electric-wire protection pipe 1 is obtained by performing press working on the round pipe member 100 having the reinforced section 11, using the press working apparatus 6A as shown in FIGS. 5 and 6. Note that it is also conceivable to use, instead of the upper metal mold 61, a wide pressure roller.

Second Embodiment

Figure 7:
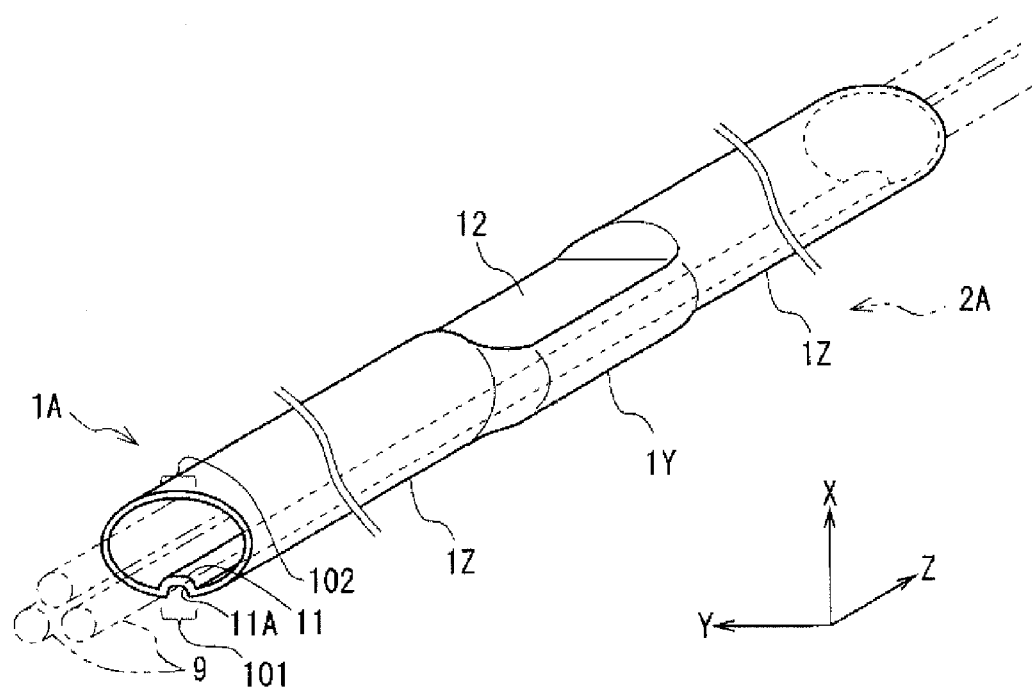
FIG. 7 is a perspective view illustrating an electric-wire protection pipe 1A according to a second embodiment.
Figure 8:
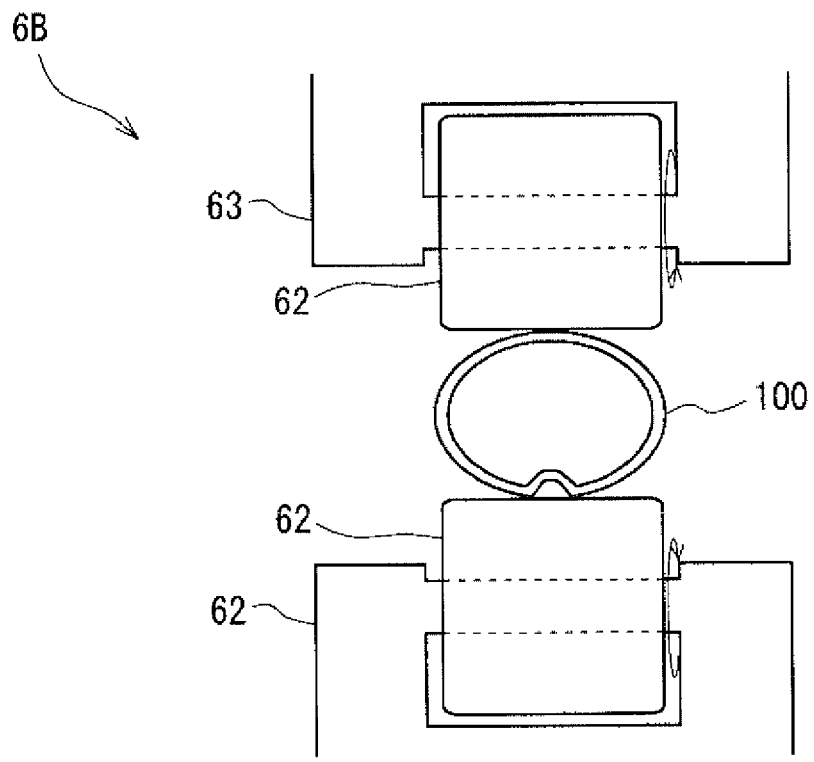
FIG. 8 is a diagram illustrating a process for forming a standard flat pipe section of the electric-wire protection pipe 1.

Hereinafter, an electric-wire protection pipe 1A and a wire harness 2A including the electric-wire protection pipe 1A according to a second embodiment of the exemplary embodiments will be described with reference to FIGS. 7 and 8. The electric-wire protection pipe 1A differs from the electric-wire protection pipe 1 shown from FIGS. 1 to 4 in the shape of the sections other than the narrowed flat pipe section 1Y. In FIGS. 7 and 8, the same reference numerals are given to the same constituent components as those shown from FIGS. 1 to 6. In the following, only the difference between the electric-wire protection pipe 1A and the electric-wire protection pipe 1 will be described.

The electric-wire protection pipe 1A is a pipe that has the flat shape over its entire length such that its size in the first direction (X-axis direction) is smaller than its size in the second direction (Y-axis direction). A narrowed flat pipe section 1Y that is flatter than the other sections is formed at a part of the electric-wire protection pipe 1A. In the following description, the flat pipe sections other than the narrowed flat pipe section 1Y of the electric-wire protection pipe 1A are referred to as "standard flat pipe sections 1Z".

The wire harness 2A includes a plurality of electric wires 9, and the electric-wire protection pipe 1A surrounding these electric wires 9. That is to say, in the wire harness 2A, the electric wires 9 pass through the hollow part of the electric-wire protection pipe 1A. Note that, in FIG. 7, the electric wires 9 are indicated by phantom lines (alternate long and two short dashed lines).

Also in the electric-wire protection pipe 1A, the narrowed flat pipe section 1Y forms a narrowed section 12 in a region in the circumferential direction in which the reinforced section 11 is not formed, the narrowed section 12 being recessed from the adjacent sections in the longitudinal direction of the electric-wire protection pipe 1A. Therefore, there is a difference in height in the longitudinal direction of the electric-wire protection pipe 1A between the narrowed flat pipe section 1Y and the adjacent sections. The adjacent sections of the electric-wire protection pipe 1A that are adjacent to the narrowed flat pipe section 1Y are the standard flat pipe sections 1Z.

FIG. 8 is a diagram illustrating a process for forming the standard flat pipe section 1Z of the electric-wire protection pipe 1A. The standard flat pipe section 1Z of the electric-wire protection pipe 1A is shaped by performing press working on a round pipe member 100 having the reinforced section 11.

More specifically, as shown in FIG. 8, the standard flat pipe section 1Z is shaped using a press working apparatus 6B. The press working apparatus 6B includes a pair of wide pressure rollers 62 that are arranged facing each other, and roller driving devices 63 for rotating the pressure rollers 62.

The round pipe member 100 having the reinforced section 11 is inserted between the pair of pressure rollers 62 from one end of the round pipe member 100. With this, the round pipe member 100 is sandwiched between the pair of pressure rollers 62, is flattened due to the pressure of the pair of pressure rollers 62, and is fed out of the processing position between the pair of pressure rollers 62. Accordingly, the entire round pipe member 100 is shaped into the standard flat pipe section 1Z.

Furthermore, by performing the press working shown in FIGS. 5 and 6 on a part of the pipe member that serves entirely as the standard flat pipe section 1Z, the narrowed flat pipe section 1Y of the electric-wire protection pipe 1A is shaped. The electric-wire protection pipe 1A is manufactured with the completion of the above-described press working.

Third Embodiment

Figure 9:
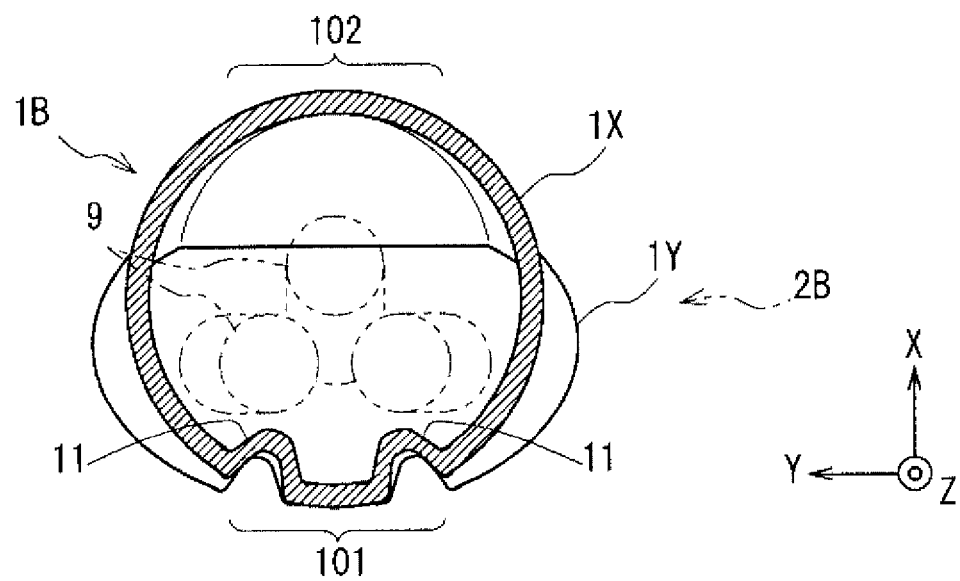
FIG. 9 is a cross-sectional view illustrating an electric-wire protection pipe 1B according to a third embodiment.

Hereinafter, an electric-wire protection pipe 1B and a wire harness 2A including the electric-wire protection pipe 1B according to a third embodiment of the exemplary embodiments will be described with reference to FIG. 9. FIG. 9 is a cross-sectional view of the electric-wire protection pipe 1B showing a cut through the same plane as in the cross-sectional view shown in FIG. 2. In FIG. 9, the same reference numerals are given to the same constituent components as those shown from FIGS. 1 to 6.

Furthermore, the wire harness 2B includes a plurality of electric wires 9 and the electric-wire protection pipe 1B surrounding these electric wires 9. Note that, in FIG. 9, the electric wires 9 are indicated by phantom lines (alternate long and two short dashed lines).

The electric-wire protection pipe 1B differs from the electric-wire protection pipe 1 shown from FIGS. 1 to 4 in the number of the reinforced section 11. In the following, only the difference between the electric-wire protection pipe 1B and the electric-wire protection pipe 1 will be described.

As shown in FIG. 9, the electric-wire protection pipe 1B has reinforced sections 11 at two positions in the circumferential direction. In the electric-wire protection pipes 1B, the first direction refers to the direction from the first circumferential region 101 in which the reinforced sections 11 are formed at two positions in the circumferential direction, toward the second circumferential region 102 that is opposite to the first circumferential region 101.

The narrowed flat pipe section 1Y of the electric-wire protection pipe 1B constitutes a part of the electric-wire protection pipe 1 in longitudinal direction. In the example shown in FIG. 9, the narrowed flat pipe section 1Y is formed into the flat shape. More specifically, the narrowed flat pipe section 1Y is formed such that its outer size in the first direction (X-axis direction) is smaller than its outer size in the second direction (Y-axis direction) that is orthogonal to the first direction. Furthermore, the narrowed flat pipe section 1Y of the present embodiment forms, in the second circumferential region 102, a narrowed section that is recessed from the adjacent sections in the longitudinal direction of the electric-wire protection pipe 1B.

The electric-wire protection pipe 1B and the wire harness 2B including the electric-wire protection pipe 1B as shown in FIG. 9 are also examples of an embodiment according to the exemplary embodiments.

Effects

The electric-wire protection pipes 1, 1A, and 1B are obtained by performing press working on the round pipe member 100 having the reinforced section 11 formed along the longitudinal direction of the round pipe member 100. In the electric-wire protection pipes 1, 1A, and 1B, the reinforced sections 11 of the electric-wire protection pipes 1, 1A, and 1B prevent the pipes from warping with the press working. Therefore, it is possible to obtain the long electric-wire protection pipes 1, 1A, and 1B each including a flat-shaped pipe section, using a simple press working process, while preventing the warping problems.

Furthermore, the narrowed flat pipe sections 1Y of the electric-wire protection pipes 1, 1A, and 1B are obtained by pressing the respective first circumferential regions 101, in which the reinforced section 11 is formed, and the second circumferential regions 102 that face the respective first circumferential regions 101 against the first direction. Therefore, when setting a pipe member to be subjected to press working in the press working apparatus, the position of the reinforced section 11 serves as a target for the press working direction, thus suppressing the press working direction with respect to the pipe member from varying. Note that the same applies to the press working that is performed on the standard flat pipe section 1Z of the electric-wire protection pipe 1A.

Furthermore, since the narrowed flat pipe sections 1Y of the electric-wire protection pipes 1, 1A, and 1B are shaped by press working in the first direction, each narrowed flat pipe section 1Y of the electric-wire protection pipes 1, 1A, and 1B is formed so as to have symmetry with respect to a plane that includes the center of the cross-section of the pipe and the center of the first circumferential region 101. Therefore, each of the electric-wire protection pipes 1, 1A, and 1B is fixed to the support 8 in the state in which the first circumferential region 101 or the second circumferential region 102 faces the support 8. With this, the centroids of the electric-wire protection pipes 1, 1A, and 1B are located at the center in the width direction (long diameter direction), and the state of each pipe that is fixed to the support 8 becomes stable.

Furthermore, the electric-wire protection pipes 1, 1A, and 1B are also applicable to the case where there is a relatively thin obstacle 81 on a part of a path on which the corresponding pipe is to be laid. In this case, the electric-wire protection pipes 1, 1A, and 1B are arranged so that the narrowed section 12 formed by the narrowed flat pipe section 1Y overlaps with the obstacle 81, as shown in FIG. 3. With the formation of the narrowed flat pipe section 1Y, the paths on which the electric-wire protection pipes 1, 1A, and 1B are to be laid have a high degree of freedom.

Furthermore, the electric-wire protection pipes 1, 1A, and 1B are also applicable to the case where it is desirable to prevent the fixture 7 for fixing the electric-wire protection pipes 1, 1A, and 1B to the support 8 such as the bottom plate of a vehicle from projecting from the electric-wire protection pipes 1, 1A, and 1B. In this case, as shown in FIG. 4, the electric-wire protection pipes 1, 1A, and 1B are fixed to the support 8 by the fixing metal fitting 71 being fit into the narrowed sections 12 of the narrowed flat pipe sections 1Y. With this, it is possible to solve the disadvantage of the fixture 7 projecting from the electric-wire protection pipes 1, 1A, and 1B.

Furthermore, the electric-wire protection pipe 1A, which is flat in the entire length in the longitudinal direction thereof, forms a hollow part whose internal cross-sectional area is sufficiently large for the plurality of electric wires 9 being inserted into the hollow part, and has an outer shape with a low projection height from the support 8. Therefore, the electric-wire protection pipe 1A is especially suitable for being laid under the floor (on the lower surface of the bottom plate) of a vehicle.

Other Considerations

The electric-wire protection pipe 1A shown in FIG. 7 may also have an embodiment in which no narrowed flat pipe section 1Y is formed. In this case, the entire electric-wire protection pipe 1A serves as the standard flat pipe section 1Z.

Furthermore, it is also conceivable that the narrowed flat pipe sections 1Y of the electric-wire protection pipes 1, 1A, and 1B and the standard flat pipe section 1Z of the electric-wire protection pipe 1A are formed so as to be flat with the size relationship that is different from the size relationship in which their sizes in the first direction (X-axis direction) are smaller than their sizes in the second direction (Y-axis direction).

For example, each of the narrowed flat pipe sections 1Y of the electric-wire protection pipes 1, 1A, and 1B may have a flat shape such that its outer size in the first direction (X-axis direction) is larger than its outer size in the second direction (Y-axis direction). Similarly, the standard flat pipe section 1Z of the electric-wire protection pipe 1A may have the flat shape such that its outer size in the first direction (X-axis direction) is larger than its outer size in the second direction (Y-axis direction).

Furthermore, in the electric-wire protection pipes 1, 1A, and 1B, the reinforced sections 11 may be sections that are located at a part in the circumferential direction of the electric-wire protection pipe 1, and constitute a protrusion forming, on the external surface of the corresponding pipe, a ridge line extending along the longitudinal direction of the pipe, and a groove extending along the longitudinal direction of the pipe on the internal surface thereof. In this case, the round pipe member 100 having the reinforced section 11 is manufactured by subjecting a metal material softened by heat to extrusion molding or pultrusion molding.

Furthermore, in the electric-wire protection pipes 1, 1A, and 1B, the reinforced sections 11 do not necessarily need to be formed continuously along the entire longitudinal direction of the electric-wire protection pipes 1, 1A and 1B.

For example, each reinforced section 11 may be formed intermittently at intervals over the entire length of the electric-wire protection pipes 1, 1A, and 1B. Alternatively, in the electric-wire protection pipes 1 and 1B, the reinforced section 11 may be formed only at a part of the region in the longitudinal direction of the electric-wire protection pipes 1 and 1B, the part of the region including the position at which the narrowed flat pipe section 1Y is formed. In this case, the round pipe member 100 having the reinforced section 11 is obtained by performing press working on the round pipe member 100X having the circular cross-sectional shape from the external surface side, as shown in FIG. 10.

However, the reinforced sections 11 are preferably formed in regions in the longitudinal direction of the electric-wire protection pipes 1, 1A, and 1B that include at least the position at which the flat pipe section 1Y or 1Z is formed. This reliably prevents the pipe from warping.

Furthermore, the electric-wire protection pipes in the embodiments are straight pipes, but the electric-wire protection pipes in the embodiments may partially have a curved section.

The exemplary embodiments have been described in detail above; however, the above description is in all respects illustrative and the claimed subject matter is not limited to the above description. Numerous modifications not named as examples are understood to be conceivable without deviating from the scope of the claimed subject matter.

It is noted that the foregoing exemplary embodiments have been provided merely for the purpose of explanation and are in no way to be construed as limiting of the claimed subject matter. While the claimed subject matter has been described with reference to the exemplary embodiments, it is understood that the words which have been used herein are words of description and illustration, rather than words of limitation. Changes may be made, within the purview of the appended claims, as presently stated and as amended, without departing from the scope and spirit of the exemplary embodiments in all of their aspects. Although the exemplary embodiments have been described herein with reference to particular structures, materials and embodiments, the exemplary embodiments are not intended to be limited to the particulars disclosed herein; rather, the exemplary embodiments extends to all functionally equivalent structures, methods and uses, such as are within the scope of the claimed subject matter.

The claimed subject matter is not limited to the above described exemplary embodiments, and various variations and modifications may be possible without departing from the scope of the claimed subject matter.

LIST OF REFERENCE NUMERALS 1, 1A, 1B Electric-wire protection pipe
1X Round pipe section
1Y Narrowed flat pipe section (flat pipe section)
1Z Standard flat pipe section (flat pipe section)
2, 2A, 2B Wire harness
6A, 6B, 6C Press working apparatus
7 Fixture
8 Support
9 Electric wire
11 Reinforced section
11A Groove
12 Narrowed section
60 Lower metal mold
61 Upper metal mold
62 Pressure roller
63 Roller driving device
71 Fixing metal fitting
72 Bolt
81 Obstacle
100 Round pipe member having reinforced section
100X Round pipe member having circular cross-sectional shape
101 First circumferential region
102 Second circumferential region

The invention claimed is:

1. An electric-wire protection pipe having a first circumferential region and a second circumferential region, the electric-wire protection pipe being formed of a material that includes metal and being configured to surround an electric wire, the electric-wire protection pipe comprising:
 a first reinforced section located at the first circumferential region in the circumferential direction of the electric-wire protection pipe, the first reinforced section including: (1) a protrusion configured to form a ridge line extending along the longitudinal direction of the electric-wire protection pipe on at least one of an internal surface and an external surface of the electric-wire protection pipe, and (2) a groove configured to extend along the longitudinal direction of the electric-wire protection pipe opposite of the protrusion; and
 a flat pipe section constituting at least a part of the electric-wire protection pipe in the longitudinal direction, the flat pipe section being configured such that an outer size of the flat pipe section in a first direction is smaller than an outer size of the flat pipe section in a second direction orthogonal to the first direction, wherein
 the first direction is a direction from a first circumferential region, in which the first reinforced section is formed, in the circumferential direction of the electric wire protection pipe toward a second circumferential region that is opposite to the first circumferential region.

2. The electric-wire protection pipe according to claim 1, wherein
 the flat pipe section includes a narrowed flat pipe section configured to form a narrowed section in a region in the circumferential direction of the narrowed flat pipe section in which the first reinforced section is not formed, the narrowed section being recessed from adjacent sections in the longitudinal direction of the electric-wire protection pipe.

3. The electric-wire protection pipe according to claim 1, wherein
 the flat pipe section includes a narrowed flat pipe section configured to form a narrowed section in a region in the circumferential direction of the narrowed flat pipe section in which the first reinforced section is not formed, the narrowed section being recessed from adjacent sections in the longitudinal direction of the electric-wire protection pipe.

4. The electric-wire protection pipe according to claim 1, further comprising:
 a second reinforced section formed adjacent to the first reinforced section, the first reinforced section and the second reinforced section being formed in the first circumferential region opposite to the second circumferential region.

5. A method for forming the electric-wire protection pipe according to claim 1, comprising:
 forming the flat pipe section by pressing: (1) the first circumferential region having the first reinforced section, and (2) the second circumferential region disposed opposite the first circumferential region, in a direction that moves the first reinforced section closer to the second circumferential region.

6. A method for forming the electric-wire protection pipe according to claim 1, comprising:
forming the first reinforced section by pressing a pressure roller against a surface of the electric-wire protection pipe against a metal mold.

7. An electric-wire protection pipe having a first circumferential region and a second circumferential region, the electric-wire protection pipe being formed of a material that includes metal and being configured to surround an electric wire, the electric-wire protection pipe comprising:
a first reinforced section located at the first circumferential region in the circumferential direction of the electric-wire protection pipe, the first reinforced section including: (1) a protrusion configured to form a ridge line extending along the longitudinal direction of the electric-wire protection pipe on at least one of an internal surface and an external surface of the electric-wire protection pipe, and (2) a groove configured to extend along the longitudinal direction of the electric-wire protection pipe opposite of the protrusion, and
a flat pipe section configured such that an outer size of the flat pipe section in a first direction is smaller than an outer size of the flat pipe section in a second direction orthogonal to the first direction, where
the first direction is a direction from a first circumferential region, in which the first reinforced section if formed, in the circumferential direction of the electric-wire protection pipe toward a second circumferential region that is opposite to the first circumferential region.

8. A wire harness comprising:
an electric wire; and
an electric-wire protection pipe having a first circumferential region and a second circumferential region, being formed of a material that includes metal and being configured to surround the electric wire, the electric-wire protection pipe including:
a reinforced section located at the first circumferential region in the circumferential direction of the electric-wire protection pipe, and the reinforced section including: (1) a protrusion configured to form a ridge line extending along the longitudinal direction of the electric-wire protection pipe on at least one of an internal surface and an external surface of the electric-wire protection pipe, and (2) a groove configured to extend along the longitudinal direction of the electric-wire protection pipe on the other surface; and
a flat pipe section constituting at least a part in the longitudinal direction of the electric-wire protection pipe, the flat pipe section being configured such that an outer size of the flat pipe section in a first direction is smaller than an outer size of the flat pipe section in a second direction orthogonal to the first direction, wherein
the first direction is a direction from a first circumferential region, in which the first reinforced section is formed, in the circumferential direction of the electric-wire protection pipe toward a second circumferential region that is opposite to the first circumferential region.

* * * * *